United States Patent
Yang et al.

(10) Patent No.: US 7,019,473 B2
(45) Date of Patent: Mar. 28, 2006

(54) NOISELESS DRIVING CIRCUIT FOR DC MOTOR

(75) Inventors: Chih-Shih Yang, Hsinchu (TW); Kung-Ching Hung, Taipei (TW)

(73) Assignee: Prolific Technology Inc., Taipei (TW)

( * ) Notice: Subject to any disclaimer, the term of this patent is extended or adjusted under 35 U.S.C. 154(b) by 0 days.

(21) Appl. No.: 10/710,074

(22) Filed: Jun. 17, 2004

(65) Prior Publication Data

US 2004/0227475 A1  Nov. 18, 2004

(51) Int. Cl.
*H02K 23/04* (2006.01)

(52) U.S. Cl. .................. 318/254; 318/138; 318/439
(58) Field of Classification Search ............... 318/254, 318/138, 439
See application file for complete search history.

(56) References Cited

U.S. PATENT DOCUMENTS

| | | | | |
|---|---|---|---|---|
| 4,268,785 A * | 5/1981 | Svendsen | .................. | 318/620 |
| 4,455,514 A * | 6/1984 | Ohno | .................. | 318/254 |
| 4,755,728 A * | 7/1988 | Ban | .................. | 318/254 |
| 4,922,169 A * | 5/1990 | Freeman | .................. | 318/254 |
| 5,093,891 A * | 3/1992 | Komiyama et al. | ......... | 388/813 |
| 5,270,631 A * | 12/1993 | Takahashi et al. | .......... | 318/135 |
| 5,363,024 A * | 11/1994 | Hiratsuka et al. | .......... | 318/254 |
| 5,457,364 A * | 10/1995 | Bilotti et al. | .............. | 318/434 |
| 5,457,766 A * | 10/1995 | Ko | .............. | 388/831 |
| 5,574,608 A * | 11/1996 | Fukuoka | .................. | 361/23 |
| 5,874,814 A * | 2/1999 | Tatsumi | .................. | 318/254 |
| 6,188,187 B1 * | 2/2001 | Harlan | .................. | 318/254 |
| 6,388,417 B1 * | 5/2002 | Keith | .................. | 318/701 |
| 2003/0063900 A1 * | 4/2003 | Wang et al. | .............. | 388/806 |

* cited by examiner

*Primary Examiner*—Rita Leykin
(74) *Attorney, Agent, or Firm*—Jiang Chyun IP Offices

(57) ABSTRACT

A noiseless driving circuit for direct current (DC) motor is disclosed. The driving circuit uses a magnetic-field sensing circuit with a Hall sensor to sense the corresponding position of the permanent magnet rotor. According to the corresponding position of the permanent magnet rotor, a linear circuit generates a signal with trapezoid waveform for driving the coil of the DC motor. The coils of the DC motor perform soft switching operations without resulting backing electromotive force (BEMF). Therefore, the noise during the operation of the DC motor can be substantially reduced.

7 Claims, 5 Drawing Sheets

NOISELESS DRIVING CIRCUIT FOR DC MOTOR

BACKGROUND OF INVENTION

1. Field of the Invention

The present invention relates to a direct current (DC) motor driving circuit; and more particularly to a noiseless driving circuit for DC motor.

2. Description of Related Art

With advancement of electronic technology, a variety of integrated circuits with powerful functions have been created. For example, central processing units (CPU) with billions of transistors are superior to any prior processors embodied in computers. Due to the operations of the tremendous number of transistor, heat resulting there-from is high. In order to maintain/improve service life of integrated circuits and enhance reliability of the circuits, and also more attention is paid on heat dissipation from integrated circuits for improving the reliability and operation speed.

For heat-sink apparatuses of personal computers or CPU therein, a direct current (DC) motor comprising a permanent magnet rotor and one or two stator coils for driving the rotor, have been widely adopted. Due to its low costs and efficiency in heat dissipation, the DC motor has been widely applied in personal computers.

FIG. 1 shows a schematic drawing of a prior art two-coil DC motor. As shown in FIG. 1, the prior art DC motor comprises a voltage regulator 110, a Hall sensor 120, a preamplifier 130, a dynamic offset cancellation circuit 140, a hysteresis comparator 150, a fan lock detection auto-restart 160, a timing control circuit 170, transistors 180 and 190, Zener diodes 191 and 193, and coils 195 and 197.

The voltage regulator 110 is adapted for providing a regulated voltage. The Hall sensor 120 is adapted for sensing the corresponding position of the permanent magnet rotor of the DC motor. Such sensing is amplified by the preamplifier 130 and converted into a square signal varying frequency with the rotational speed of the permanent magnet rotor by the hysteresis comparator 150. Due to the weakness of output signal from the Hall sensor 120, the preamplifier 130 further comprises the dynamic offset cancellation circuit 140 to prevent the voltage offset from the preamplifier 130. The timing control circuit 170, according to the square signal from the hysteresis comparator 150, outputs square-signal control signals C1 and C2 for control of the transistors 180 and 190, respectively. The difference of phases of the square-signal control signals C1 and C2 is 180 degrees. The square-signal control signals C1 and C2 can, therefore, alternatively drive the stator coils 195 and 197 of the DC motor and keep continuous operation of the DC motor.

When the DC motor is accidentally locked, the voltage applied thereto should be removed, lest the DC motor is damaged. The prior art circuit shown in FIG. 1 also applies a fan lock detection auto-restart 160. When the square signal from the hysteresis comparator 150 is not detected, the fan lock detection auto-restart 160 controls the timing control circuit 170 to stop sending the square-signal control signals C1 and C2. The Zener diodes are used to prevent transient pulses resulting from the switch of circuit.

FIG. 2 is a schematic drawing of a prior art one-coil DC motor. As shown in FIG. 2, the prior art DC motor comprises a voltage regulator 210, a Hall sensor 220, a preamplifier 230, a dynamic offset cancellation circuit 240, a hysteresis comparator 250, a fan lock detection auto-restart 260, a timing control circuit 270, transistors 281, 283, 285 and 287, Zener diodes 291 and 293, and a coil 290.

Except of the operations of the timing control circuit 270, and transistors 281, 283, 285 and 287, the operations of other circuits are similar to those in FIG. 1. The timing control circuit 270 outputs square-signal control signals C3, C4, C5 and C6 for controlling the transistors 281, 283, 285 and 287 according to the square signal from the hysteresis comparator 250. The phase angles of the square-signal control signals C3, C4, C5 and C6 cooperate in a manner to alternatively drive the stator coil 290 of the DC motor for continuously operating the DC motor.

The prior art DC motors shown in FIG. 1 and FIG. 2, however, use the square-signal control signal to switch the operations of coils. During switching such operations, backing electromotive force (BEMF) may easily cause transient pulses. These transient pulses may generate noises.

SUMMARY OF INVENTION

Accordingly, the present invention is directed to a noiseless driving circuit for direct current (DC) motor. The driving circuit drives the coil of the DC motor by applying the trapezoid driving waveform generated from the linear driving circuit so that the coil of the DC motor performs soft switching operations to reduce noise during the operation of the DC motor.

According to an embodiment of the present invention, the noiseless driving circuit for driving a DC motor with a permanent magnet rotor comprises a magnetic-field sensing circuit, a linear driving circuit and a voltage regulator. The magnetic-field sensing circuit is adapted for sensing a corresponding position of the permanent magnet rotor for outputting a sensing signal. The linear driving circuit is adapted for receiving the sensing signal and amplifying the sensing signal with a gain to a saturation level for generating a first driving output and a second driving output with a trapezoid driving waveform. A differential phases of the first driving output and the second driving output is 180 degrees. The voltage regulator is adapted to provide a regulated voltage.

In one embodiment of the present invention, the linear driving circuit comprises a first operational amplifier and a second operational amplifier. The first operational amplifier is adapted for amplifying the sensing signal with the gain for generating the first driving output. The second operational amplifier is adapted for amplifying the sensing signal in reversed-phase with the gain for generating the second driving output.

In one embodiment of the present invention, the magnetic-filed sensing circuit comprises a Hall sensor and a preamplifier. The Hall sensor is adapted for sensing the corresponding position of the permanent magnet rotor. The preamplifier is adapted for amplifying an output from the Hall sensor for generating the sensing signal.

In one embodiment of the present invention, the preamplifier serves dynamic offset cancellation function.

In one embodiment of the present invention, the noiseless driving circuit for DC motor further comprises a hysteresis comparator and a fan lock detection auto-restart. The hysteresis comparator is adapted for comparing the sensing signal for generating a digital rotation-detecting signal. The fan lock detection auto-restart is adapted for terminating supply voltage of the linear driving circuit when the rotation-detecting signal shows that the DC motor is locked. Therefore, damage to the DC motor can be reduced.

According to an embodiment of the present invention, the noiseless driving circuit utilizes the first driving output and the second driving output separately for driving a two-coil DC motor.

According to another embodiment of the present invention, the noiseless driving circuit utilize the first driving output and the second driving output alternatively for driving a one-coil DC motor with a coil.

Accordingly, the present invention provides a driving circuit for a DC motor, which is capable of reducing noise during the operation of the DC motor. The driving circuit drives the coil of the DC motor by applying the trapezoid driving waveform generated from the linear driving circuit so that the coil of the DC motor performs soft switching operations for reducing noise during the operation of the DC motor.

In order to make the aforementioned and other objects, features and advantages of the present invention understandable, a preferred embodiment accompanied with figures is described in detail below.

DETAILED DESCRIPTION

Figure 3:
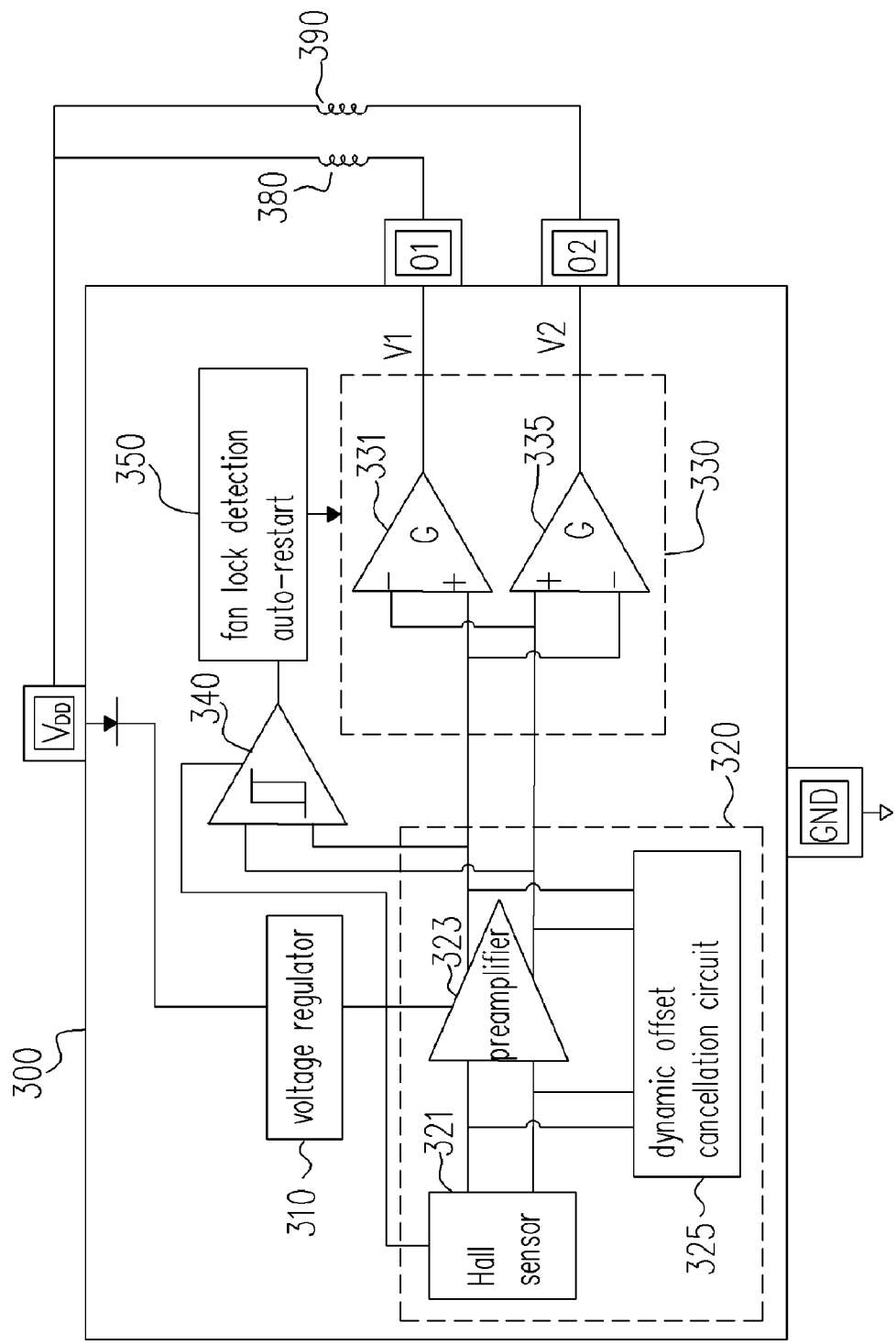
FIG. 3 is a schematic drawing of a noiseless driving circuit for DC motor according to an embodiment of the present invention.
Figure 5:
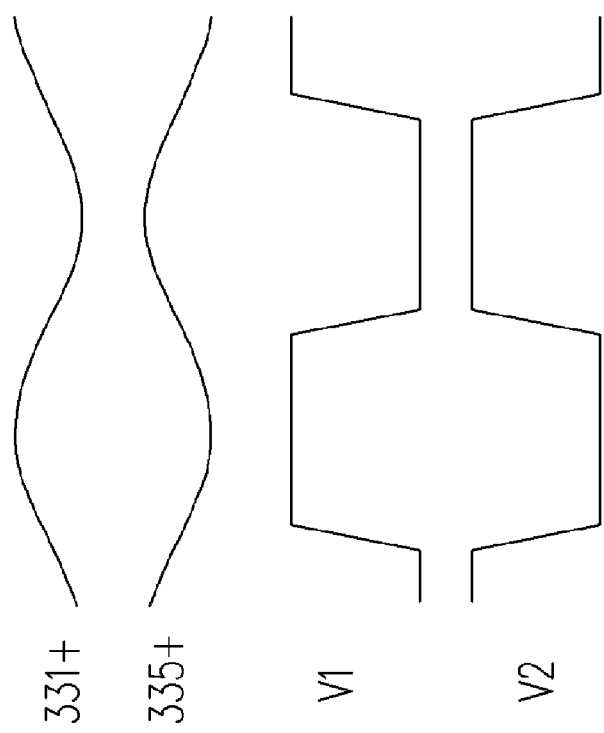
FIG. 5 is a diagram showing the input signal waveforms at the input terminals of the operational amplifiers of noiseless driving circuit shown in FIG. 3and the corresponding output signal waveforms at the output terminals of the operational amplifiers of noiseless driving circuit shown in FIG. 3 according to an embodiment of the present invention.

FIG. 3 is a schematic noiseless driving circuit for DC motor according to an embodiment of the present invention. FIG. 5 is a diagram showing the input signal waveforms at the input terminals of the operational amplifiers 331 and 335 of noiseless driving circuit shown in FIG. 3 and the corresponding output signal waveforms at the output terminals of the operational amplifiers 331 and 335 according to an embodiment of the present invention. Referring to FIG. 3, the noiseless driving circuit 300, according to the embodiment of the present invention, is adapted for driving a DC motor with a permanent magnet rotor (not shown) and stator coils 380 and 390. One of ordinary skill in the art understands that the noiseless driving circuit 300 can also be adapted for driving a DC motor with a permanent magnet rotor and a single stator coil. In the later embodiments, two terminals of the stator coil could be coupled to the locations 01 and 02. The first driving output V1 and the second driving output V2 can be utilized alternatively for driving the stator coil.

Referring to FIG. 3, the noiseless driving circuit 300 for DC motor comprises a voltage regulator 310; a magnetic-field sensing circuit 320 comprising a Hall sensor 321, a preamplifier 323 and a dynamic offset cancellation circuit 325; a linear driving circuit 330 comprising a first operational amplifier 331 and a second operational amplifier 335; a hysteresis comparator 340; and a fan lock detection auto-restart 350.

The voltage regulator 310 provides a regulated voltage to the circuit. The Hall sensor 321 senses the corresponding position of the permanent magnet rotor (not shown). Such sensing is amplified by the preamplifier 323 for outputting a sensing signal in response to the position of the permanent magnetic rotor. Because to the output signal from the Hall sensor 321 is weak, the dynamic offset cancellation circuit 325 is applied to remove the voltage offset from the preamplifier 323, lest the sensing signal outputted from the preamplifier 323 is offset. The sensing signal is transmitted to the first operational amplifier 331 and the second operational amplifier 335. The gains G of the first operational amplifier 331 and the second operational amplifier 335 should be sufficiently high enough for amplifying the first driving output V1 from the first operational amplifier 331 and the second driving output V2 from the second operational amplifier 335 to a saturation level. As a result, the first driving output V1 and the second driving output V2 are trapezoid waveform. Since the sensing signal input to the first operational amplifier 331 is in reversed-phase compared to that of the second operational amplifier 335, the differential phases of the first driving output V1 and the second driving output V2 is 180 degrees. Accordingly, the first operational amplifier 331 and the second operational amplifier 335 alternatively drive the stator coils 380 and 390.

When the DC motor is accidentally locked, voltages supply to the stator coils 380 and 390 must be stopped in order to reduce damage the DC motor. The noiseless driving circuit 300 for DC motor uses a hysteresis comparator 340 to compare the sensing signal for generating a digital rotation-detecting signal. Accordingly, when the DC motor operates normally, the rotation-detecting signal will be a square signal varying with the rotational speed of the DC motor. When the fan lock detection auto-restart 350 fails detect the rotation-detecting signal, the DC motor is locked. The voltage applied to the first operational amplifier 331 and the second operational amplifier 335 is then removed to protect the DC motor from damage.

Figure 1:
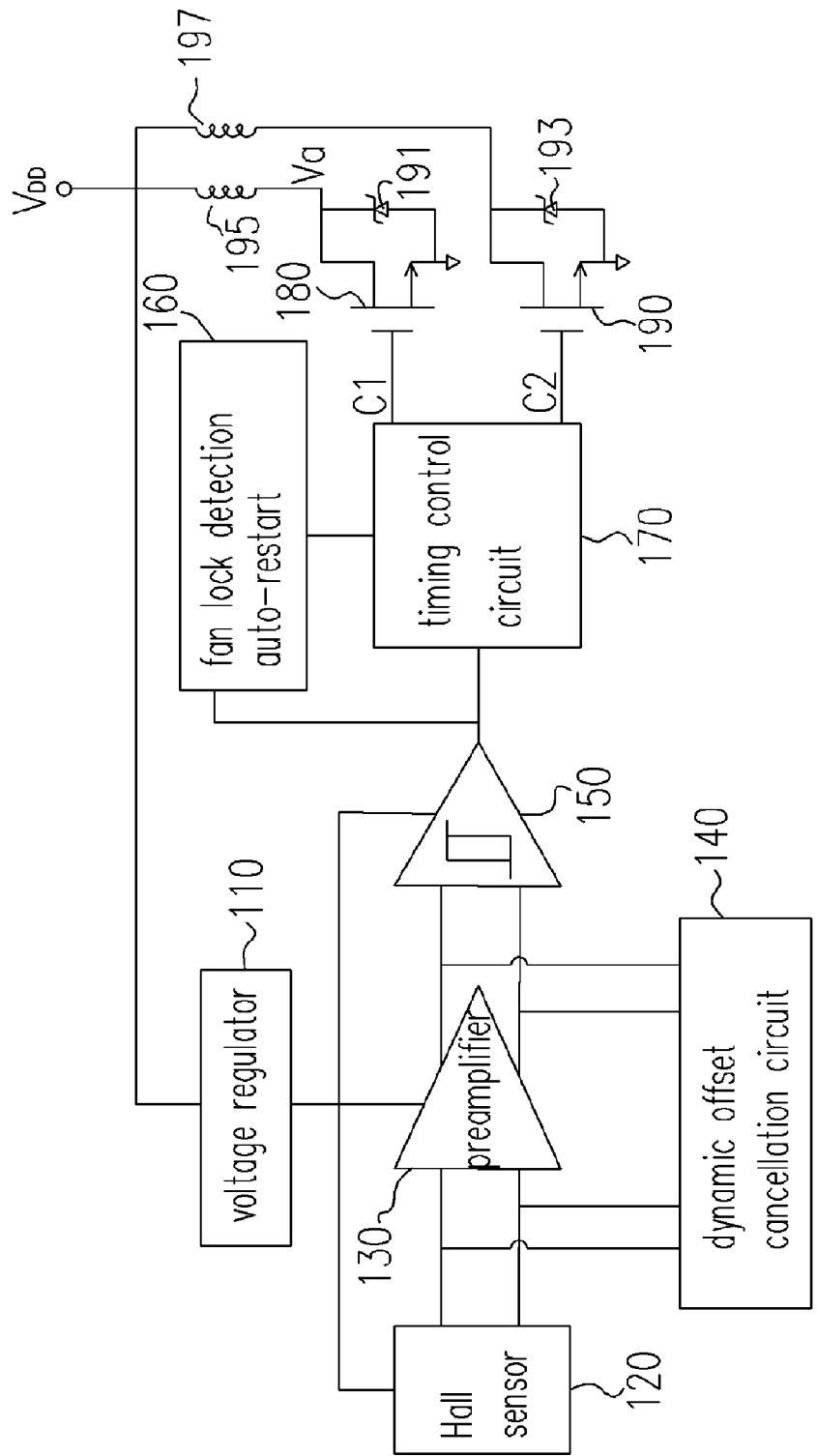
FIG. 1 is a schematic drawing of a conventional two-coil DC motor.
Figure 2:
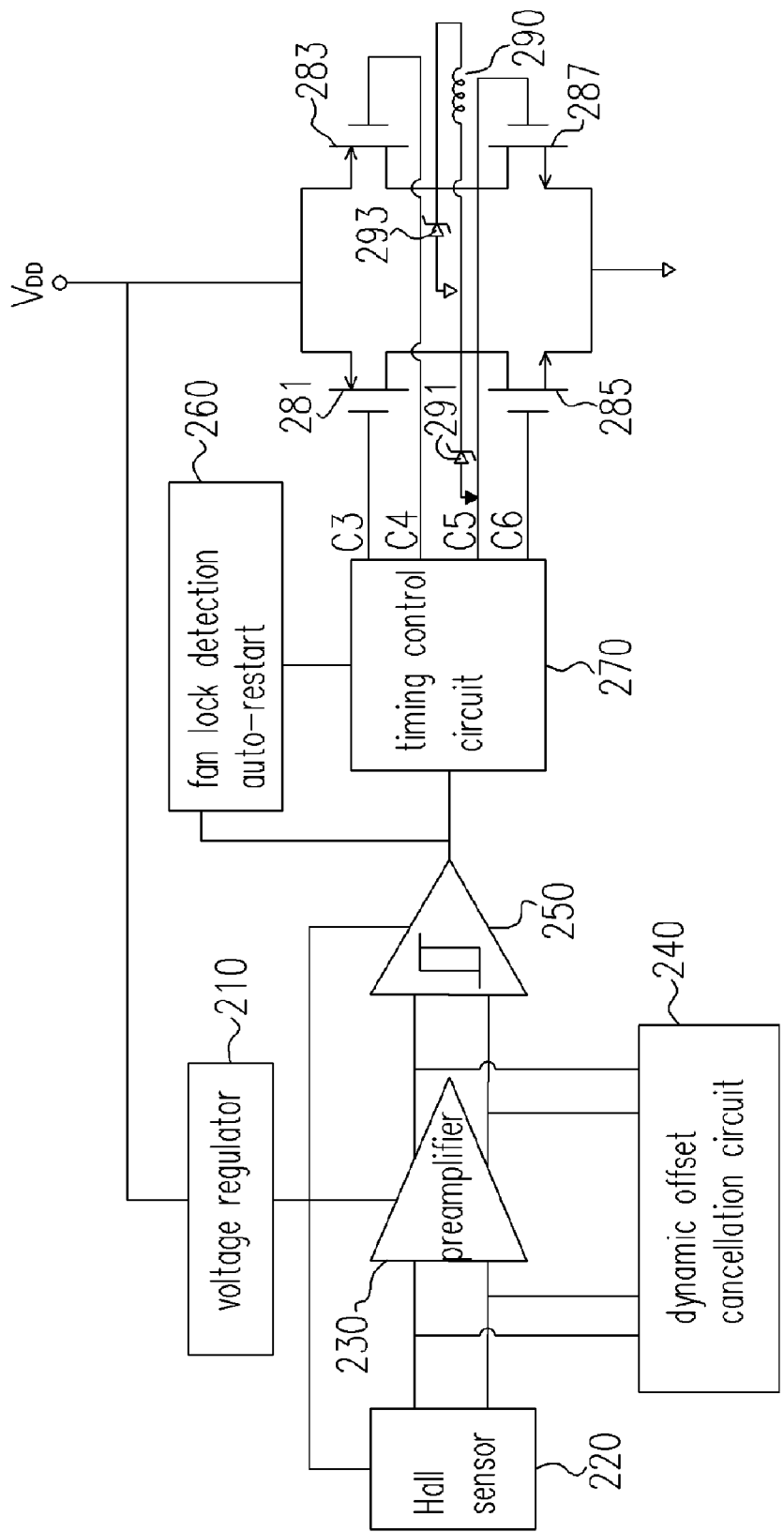
FIG. 2 is a schematic drawing of a conventional one-coil DC motor.
Figure 4:
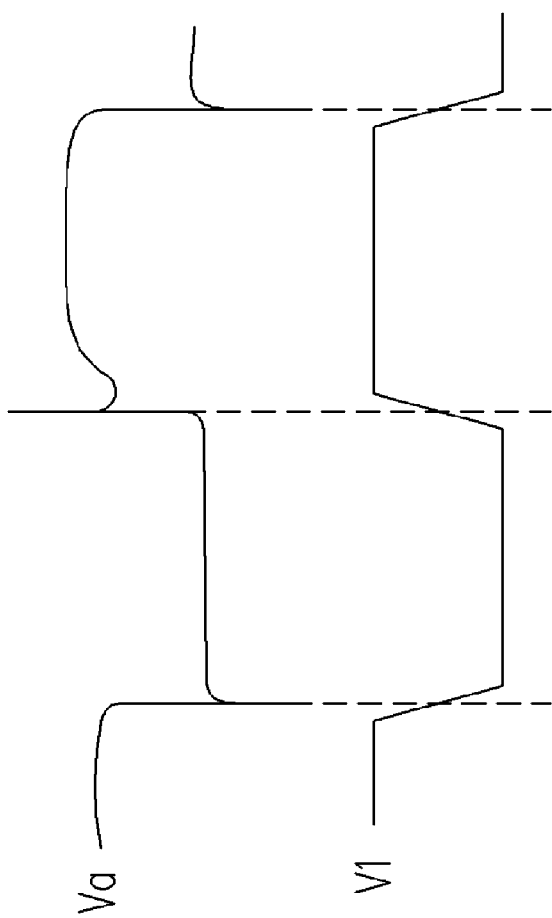
FIG. 4 is waveforms of driving output voltage Va of conventional driving circuit shown in FIG. 1 and driving output voltage V1 of noiseless driving circuit shown in FIG. 3.

FIG. 4 show waveforms of driving output voltage Va of conventional DC motor driving circuit shown in FIG. 1 and driving output voltage V1 of noiseless driving circuit shown in FIG. 3. As can be seen from these waveforms, the waveform Va have transient pulses, indicating the conventional DC motor driving circuit drives the DC motor by switching signals. These transient pulses result in noise during operation of the DC motor. Unlike the conventional DC motor driving circuit, the waveform V1 have no transient pulses indicating that the DC motor driving circuit of the present invention performs soft switching operation without generating the transient pulses. Therefore, the use of Zener diodes, as in the case of conventional DC motor driving circuit, for preventing transient pulses resulting from the switch of circuit are not required.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A noiseless driving circuit for direct current (DC) motor, for drive a DC motor with a permanent magnet rotor, comprising:

a magnetic-field sensing circuit, adapted for sensing a corresponding position of the permanent magnet rotor and outputting a sensing signal;

a linear driving circuit, adapted for receiving the sensing signal and amplifying the sensing signal with a gain to a saturation level for generating a first driving output and a second driving output with a trapezoid driving waveform, wherein a differential phases of the first driving output and the second driving output is 180 degrees and no transient pulses are generated; and a voltage regulator, adapted for providing a regulated voltage.

2. The noiseless driving circuit for direct current (DC) motor of claim 1, wherein the linear driving circuit comprises:

a first operational amplifier, for amplifying the sensing signal with the gain for generating the first driving output; and a second operational amplifier, for amplifying the sensing signal in reversed-phase with the gain for generating the second driving output.

3. The noiseless driving circuit for direct current (DC) motor of claim 1, wherein the magnetic-field sensing circuit comprises:

a Hall sensor, for sensing the corresponding position of the permanent magnet rotor; and a preamplifier, for amplifying an output from the Hall sensor for generating the sensing signal.

4. The noiseless driving circuit for direct current (DC) motor of claim 3, wherein the preamplifier serves a dynamic offset cancellation function.

5. The noiseless driving circuit for direct current (DC) motor of claim 1, further comprising:

a hysteresis comparator, for comparing the sensing signal for generating a digital rotation-detecting signal; and a fan lock detection auto-restart, for terminating supply voltage of the linear driving circuit when the rotation-detecting signal indicates that the DC motor is locked.

6. The noiseless driving circuit for direct current (DC) motor of claim 1, wherein the DC motor comprises two coils driven by the first driving output and the second driving output separately.

7. The noiseless driving circuit for direct current (DC) motor of claim 1, wherein the DC motor comprises a coil driven by the first driving output and the second driving output alternatively.

* * * * *